US012381049B2

(12) United States Patent
Tokar et al.

(10) Patent No.: US 12,381,049 B2
(45) Date of Patent: Aug. 5, 2025

(54) CIRCUIT BREAKER MOUNTING KIT FOR USE WITHIN A MOTOR CONTROL CENTER

(71) Applicant: Westinghouse Electric Company LLC, Cranberry Township, PA (US)

(72) Inventors: Adam E. Tokar, Greensburg, PA (US); David C. Lucas, Manor, PA (US); Walter J. Drzal, Donegal, PA (US); Joshua J. Yaklich, North Huntingdon, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 186 days.

(21) Appl. No.: 17/755,794

(22) PCT Filed: Nov. 6, 2020

(86) PCT No.: PCT/US2020/059311
§ 371 (c)(1),
(2) Date: May 9, 2022

(87) PCT Pub. No.: WO2021/092310
PCT Pub. Date: May 14, 2021

(65) Prior Publication Data
US 2022/0399173 A1 Dec. 15, 2022

Related U.S. Application Data

(60) Provisional application No. 62/932,787, filed on Nov. 8, 2019.

(51) Int. Cl.
*H02K 5/04* (2006.01)
*H01H 21/22* (2006.01)
*H02K 11/30* (2016.01)

(52) U.S. Cl.
CPC ............... *H01H 21/22* (2013.01); *H02K 5/04* (2013.01); *H02K 11/30* (2016.01)

(58) Field of Classification Search
CPC . H01H 21/22; H02B 1/30; H02B 1/32; H02B 1/38
See application file for complete search history.

(56) References Cited

U.S. PATENT DOCUMENTS

| 3,170,091 | A | 2/1965 | Hudson |
| 9,337,629 | B2 * | 5/2016 | Oneufer .................. H02B 1/48 |
| 2016/0322791 | A1 | 11/2016 | Oneufer |

FOREIGN PATENT DOCUMENTS

WO 2021092310 A1 5/2021

OTHER PUBLICATIONS

International Search Report and Written Opinion for International PCT Application No. PCT/US2020/059311, dated Feb. 11, 2021.
(Continued)

*Primary Examiner* — Vanessa Girardi
(74) *Attorney, Agent, or Firm* — K&L Gates LLP

(57) ABSTRACT

A motor control center circuit breaker replacement kit includes a standoff having a first plurality of mounting holes corresponding to existing holes on a bucket of the motor control center and a second plurality of holes corresponding to existing holes on a circuit breaker, a door interface panel having a third plurality of holes corresponding to existing holes on a door of the motor control center, the door interface panel having an opening formed therein having a size and shape corresponding to a handle operator associated with the circuit breaker, and a safety latch having a slot structured to receive a tab of the handle operator.

18 Claims, 15 Drawing Sheets

(56) References Cited

OTHER PUBLICATIONS

Low Voltage Products & Systems, ABB Inc., revised Jan. 2015, pp. 1-90.

* cited by examiner

CIRCUIT BREAKER MOUNTING KIT FOR USE WITHIN A MOTOR CONTROL CENTER

CROSS-REFERENCE TO RELATED APPLICATIONS

This application is a U.S. National Stage Entry under 35 U.S.C. § 371 of International Patent Application No. PCT/US2020/059311, entitled MOTOR CONTROL CENTER CIRCUIT BREAKER REPLACEMENT KIT AND METHOD, filed Nov. 6, 2020, which U.S. Provisional Application No. 62/932,787, filed Nov. 8, 2019, entitled MOTOR CONTROL CENTER CIRCUIT BREAKER REPLACEMENT KIT AND METHOD, the entire disclosures of which are hereby incorporated by reference herein.

FIELD

The disclosed concept pertains generally to motor control centers and, more particularly, to a kit and method for replacing a motor control center circuit breaker.

BACKGROUND OF THE INVENTION

One type of motor control center is embodied as a vertical cabinet with a bucket including a motor starter and an associated circuit breaker. One particular motor control center design utilized in the nuclear industry includes a bucket that houses a non-digital molded case circuit breaker (MCCB) and associated motor starter.

FIGS. 1 and 2 are images of a motor control center 10 utilized in the nuclear industry and FIG. 3 is an image of an empty motor control center bucket 40. The motor control center 10 includes a circuit breaker 20, a rotational handle mechanism 22, and a motor starter 30. The motor control center 10 is a typical General Electric (GE) 7700 motor control center and the circuit breaker 20 is a GE MCCB. The rotational handle mechanism 22 allows manual energizing/de-energizing of the circuit breaker 20. The motor control center 10 includes a door 50 with an opening corresponding to the shape and location of the rotational handle mechanism 22, thus allowing a user outside the bucket 40 to manually energize/de-energize the circuit breaker 20. The bucket 40 and door 50 are designed particularly to house the circuit breaker 20 and rotational handle mechanism 22.

The circuit breaker 20 is a non-digital circuit breaker. However, this particular circuit breaker 20 is being discontinued and replaced with a digital circuit breaker. Circuit breakers have a limited lifespan and, besides reaching the end of their lifespan, can break or be damaged, any of which may lead to a need to replace the circuit breaker 20.

In applications in the nuclear industry, switching from a non-digital circuit breaker to a digital circuit breaker is not preferred. Switching to a digital circuit breaker introduces difficulties such as, among other things, complying with cyber security requirements. Additionally, modifying the bucket 40 in manners such as cutting, drilling, or thread tapping it may be prohibited. Thus, in the case that the circuit breaker 20 has been discontinued and there is no desire to move to a digital circuit breaker, the entire motor control center 10 would need to be replaced with a different motor control center, which is cost prohibitive and labor intensive.

There is room for improvement in replacing circuit breakers in motor control centers.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

In accordance with example embodiments of the disclosed concept, a replacement circuit breaker kit allows a new circuit breaker, different than the one it is replacing, to be installed in an existing motor control center without making modifications, such as cutting, drilling, or thread-tapping, to the bucket of the motor control center.

Figure 1:
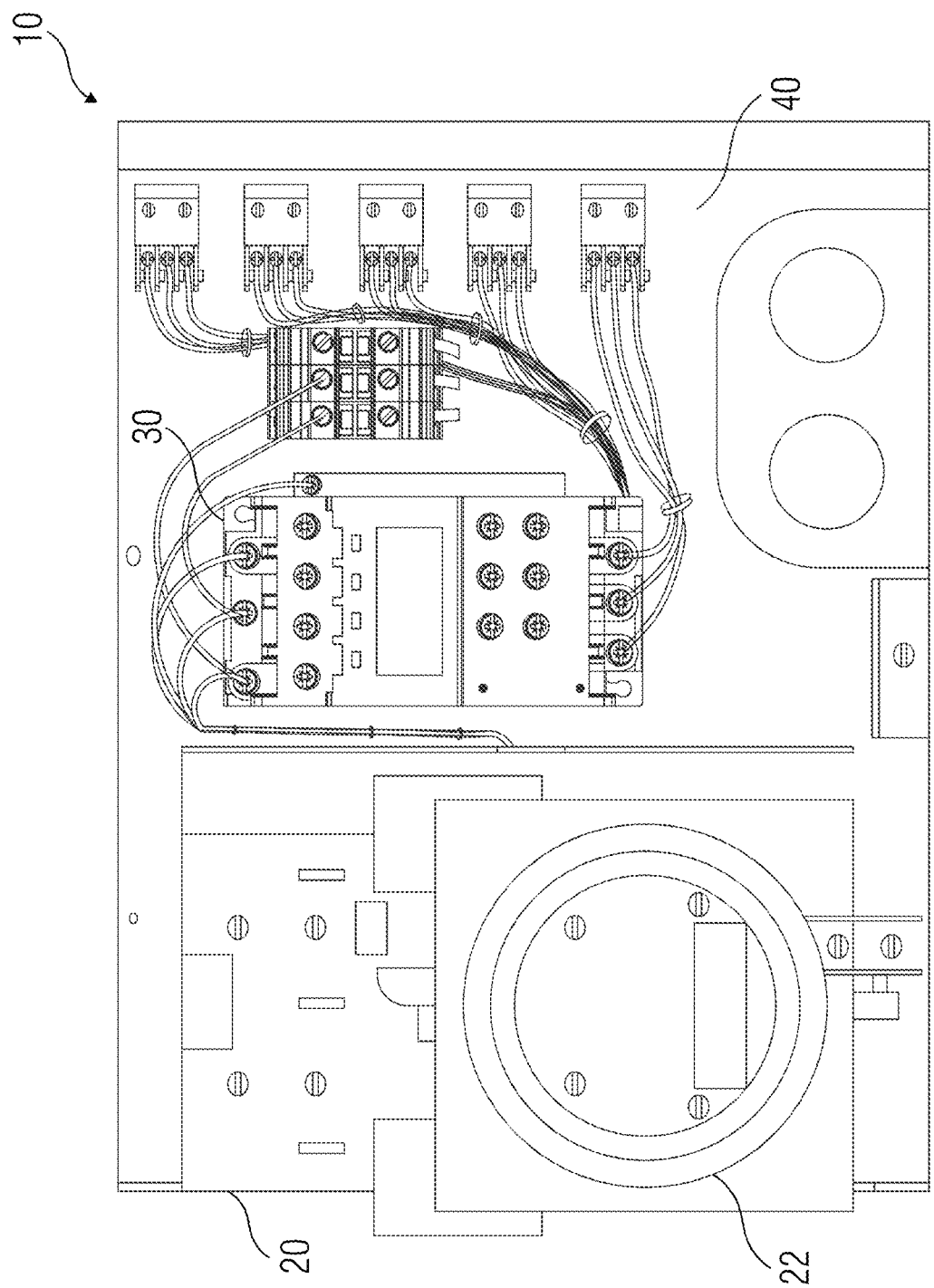
FIG. 1 is an image of a motor control center bucket.
Figure 2:
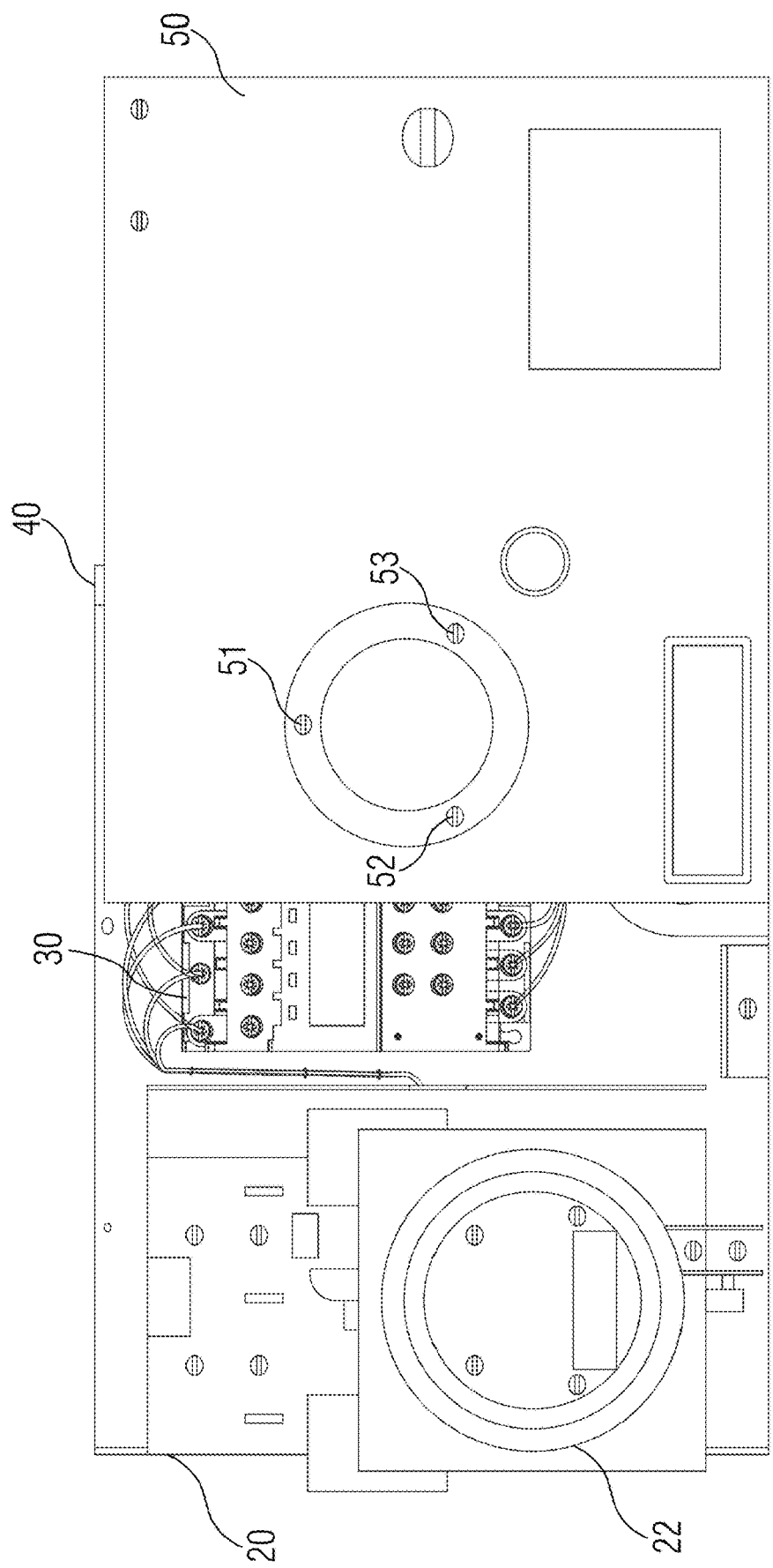
FIG. 2 is an image of a motor control center bucket including a door.
Figure 3:
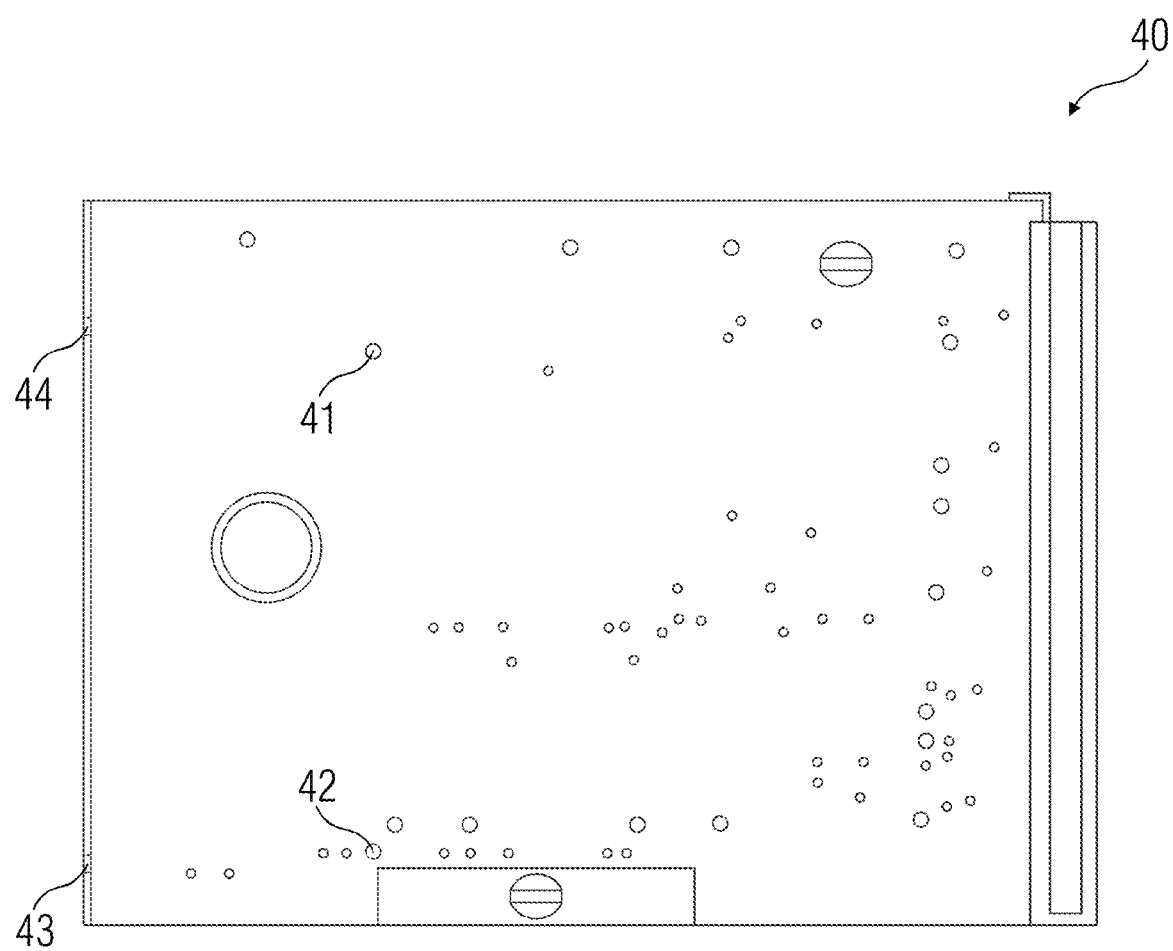
FIG. 3 is an image of an empty motor control center bucket.
Figure 4:
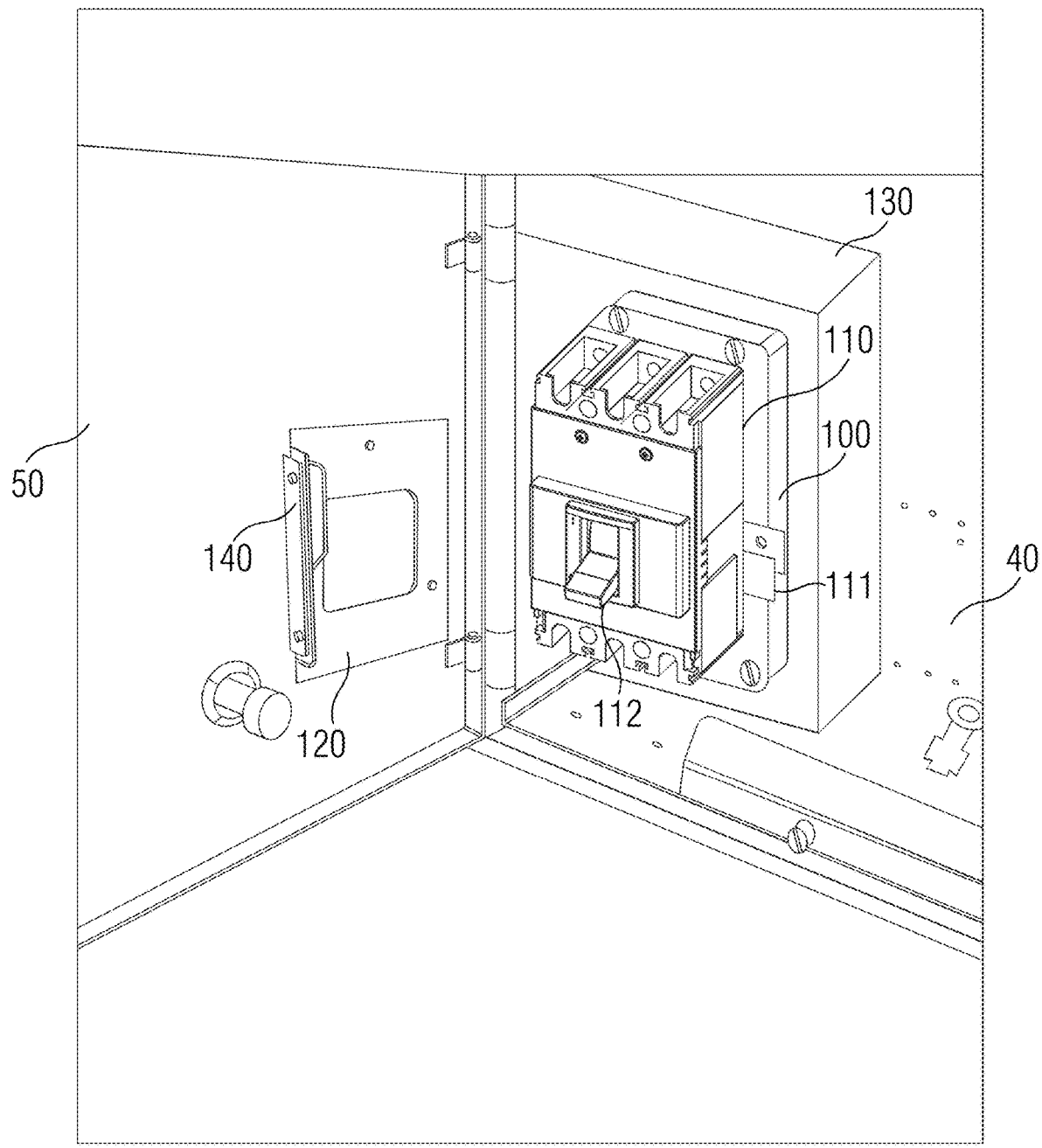
FIG. 4 is an image of a motor control center including a replacement circuit breaker kit in accordance with an example embodiment of the disclosed concept.
Figure 5:
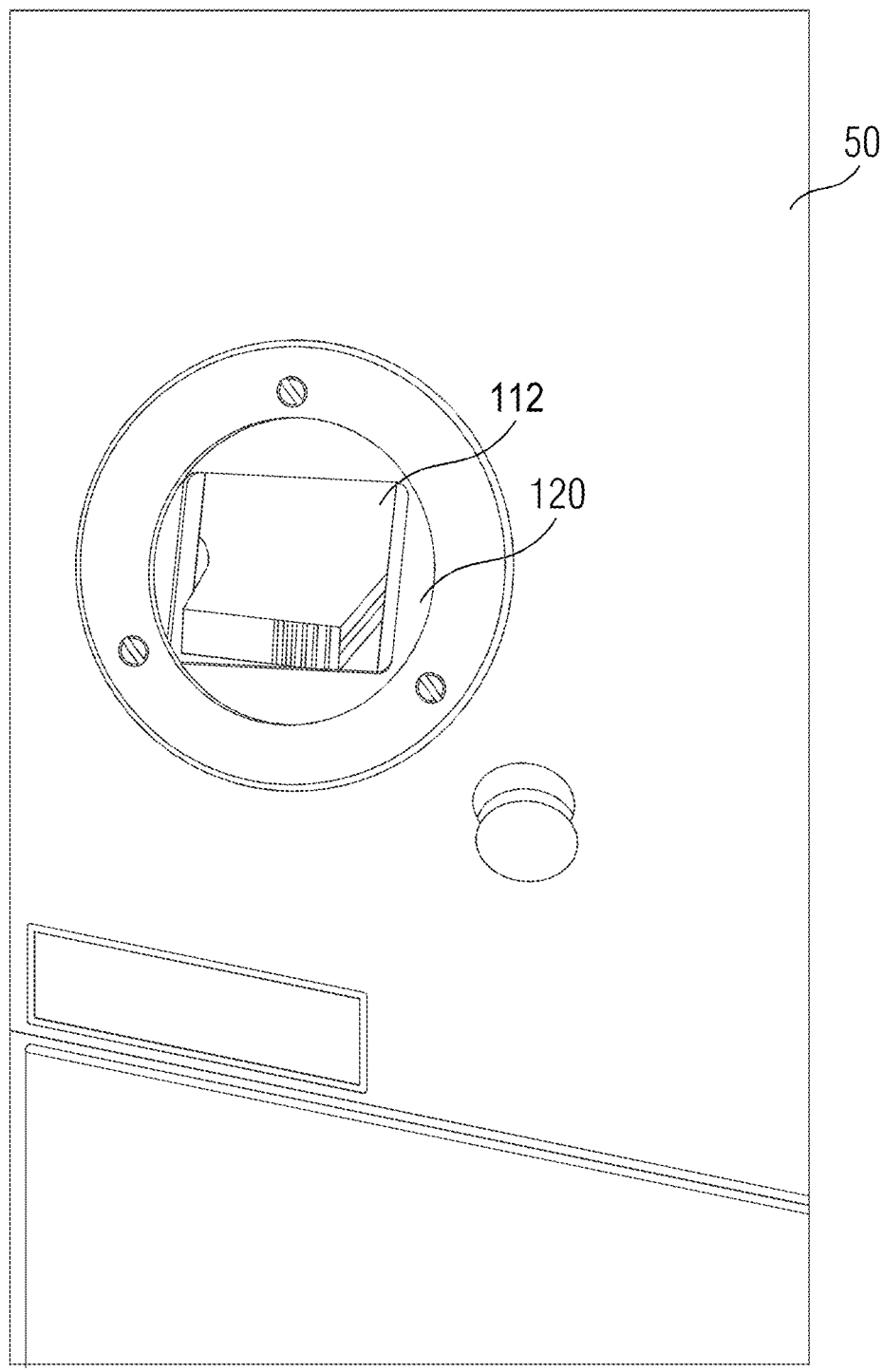
FIG. 5 is an image of a motor control center including a replacement circuit breaker kit with the door closed in accordance with an example embodiment of the disclosed concept.
Figure 6A:
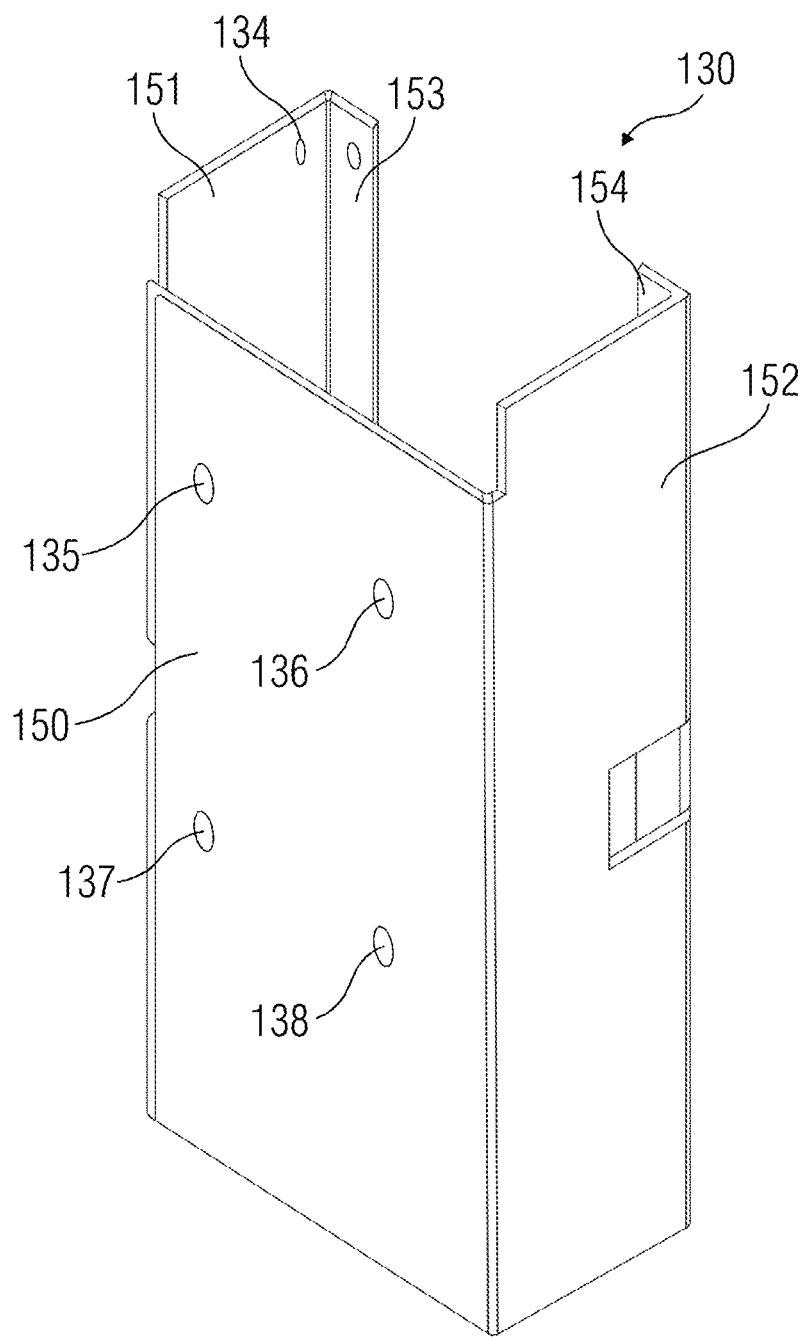
FIGS. 6A-D are views of a standoff included in a circuit breaker replacement kit in accordance with an example embodiment of the disclosed concept.
Figure 6B:
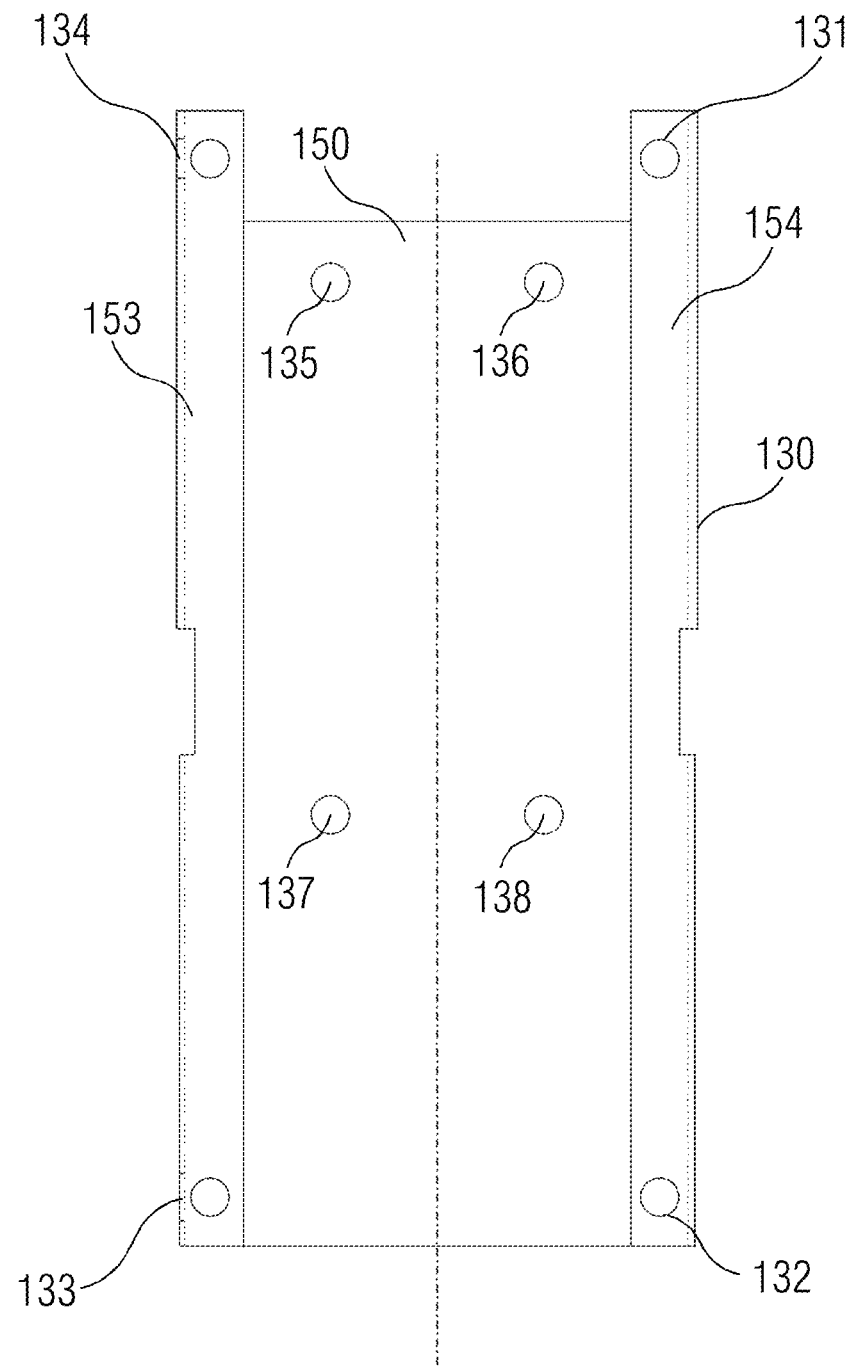
Figure 6C:
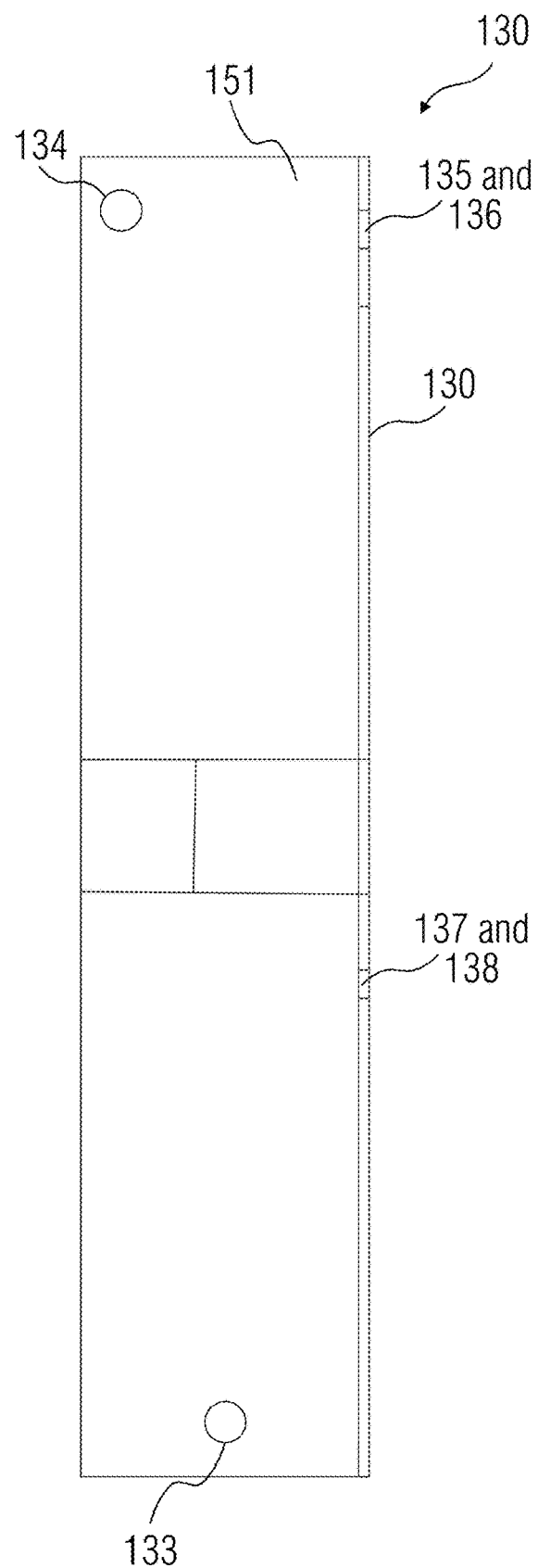
Figure 6D:
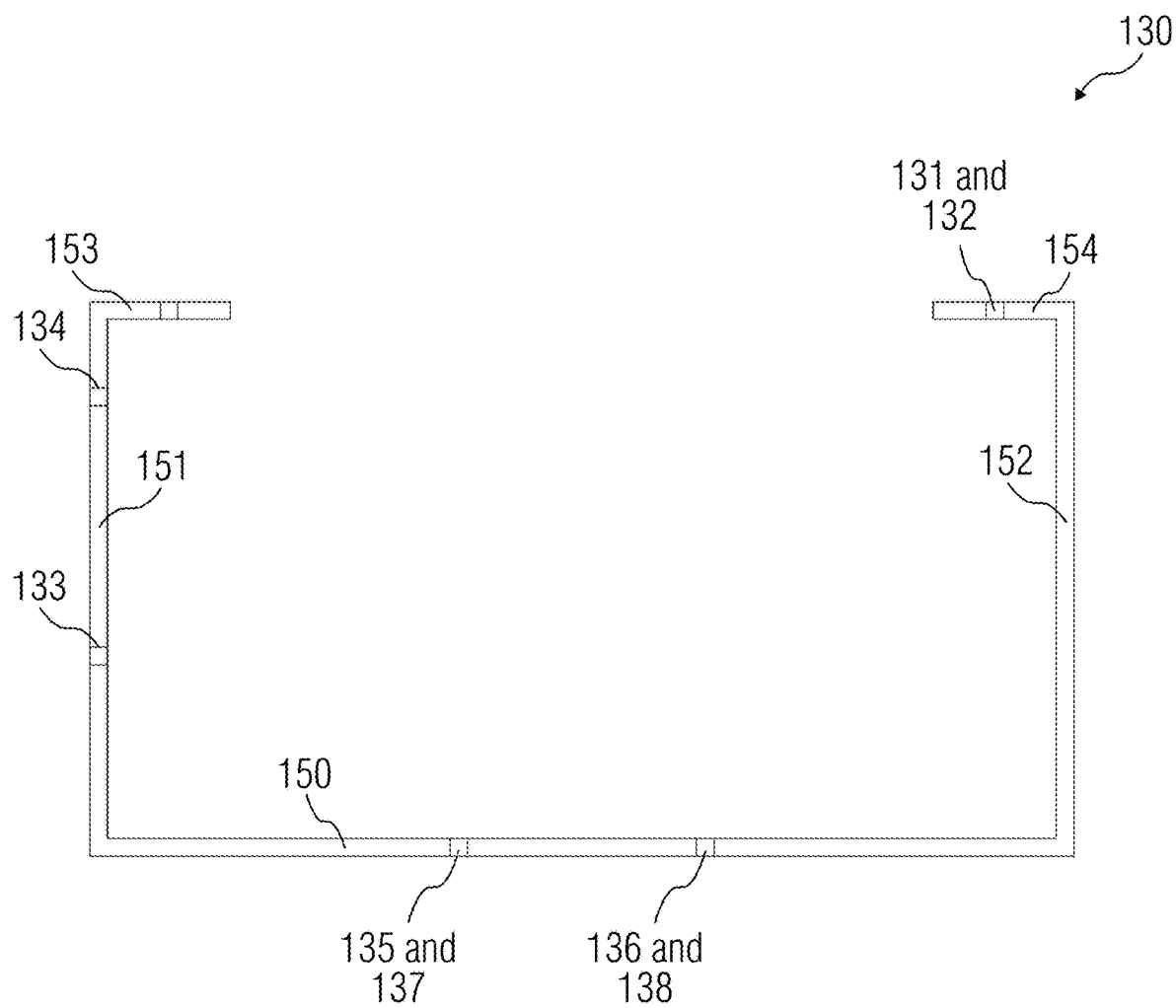
Figure 7A:
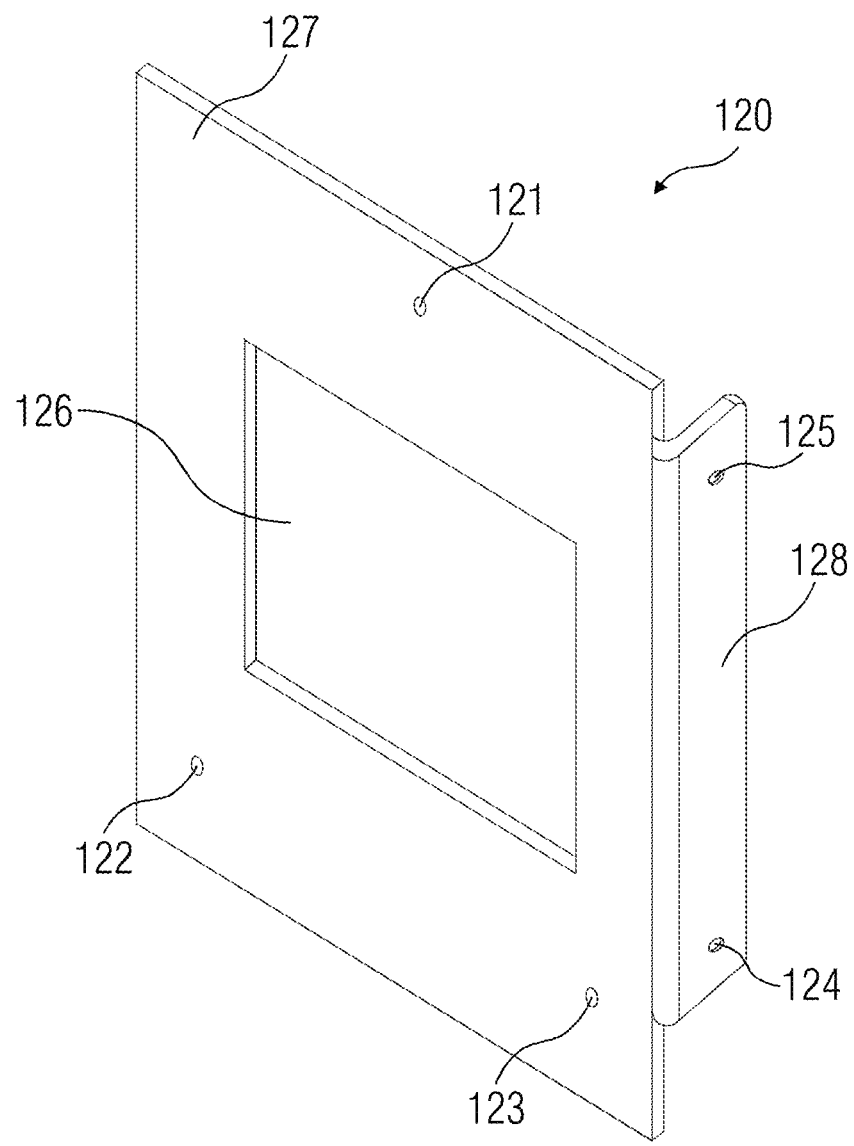
FIGS. 7A-D are views of a door interface panel included in a circuit breaker replacement kit in accordance with an example embodiment of the disclosed concept.
Figure 7B:
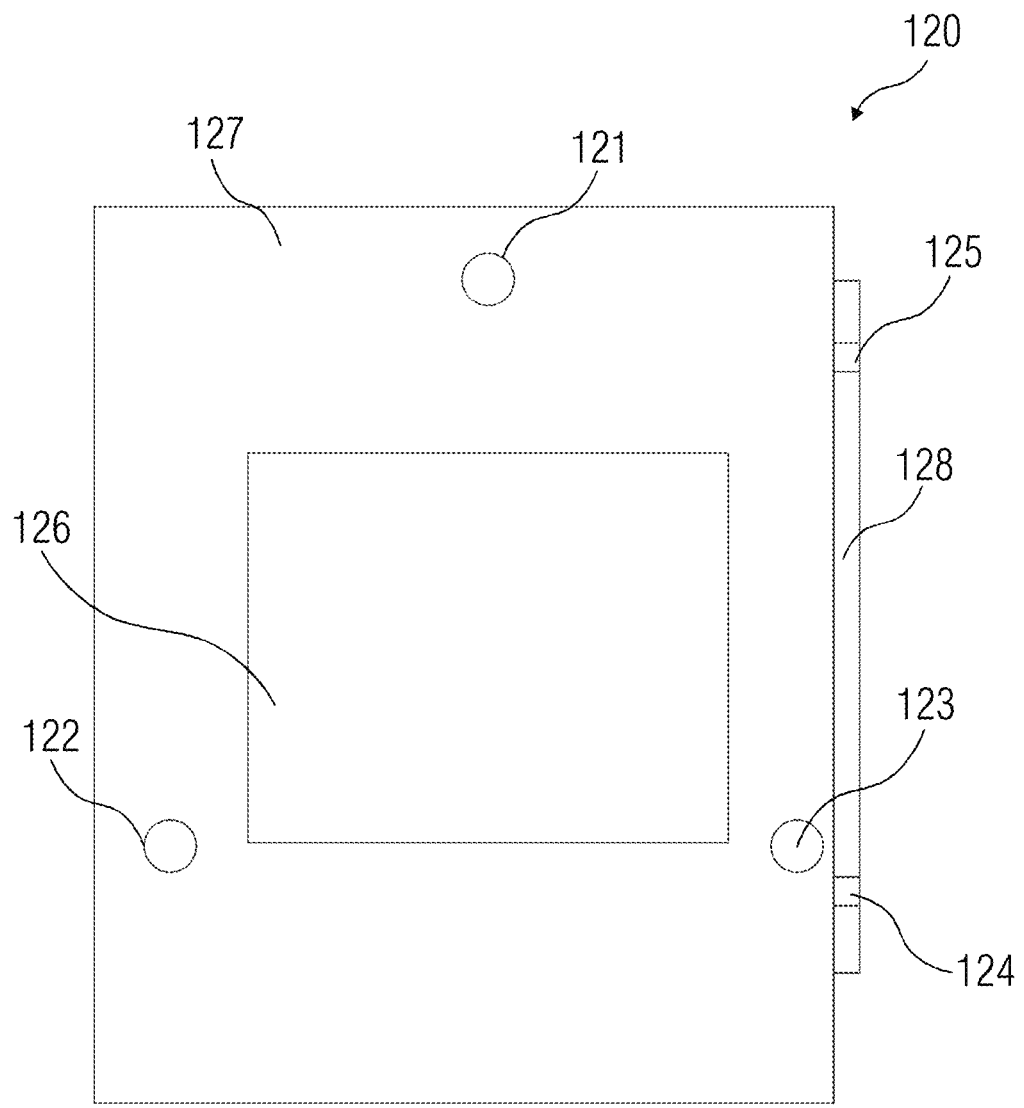
Figure 7C:
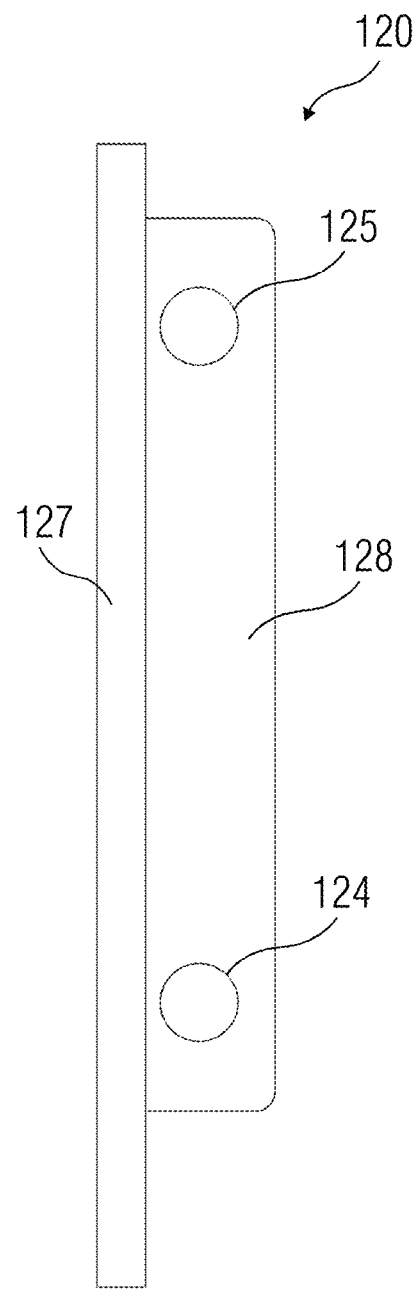
Figure 7D:
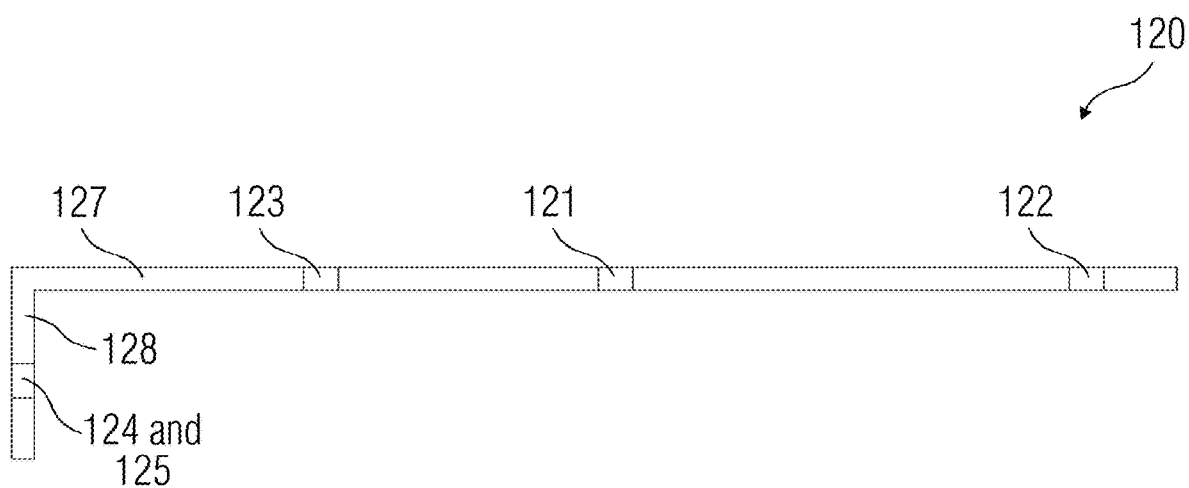

FIG. 4 is an image of a motor control center including a replacement circuit breaker kit in accordance with an example embodiment of the disclosed concept and FIG. 5 is an image of a motor control center including a replacement circuit breaker kit with the door closed in accordance with an example embodiment of the disclosed concept. The replacement circuit breaker kit includes a door interface panel 120, a standoff 130, and a safety latch 140. The replacement circuit breaker kit allows a circuit breaker 100 and handle operator 110, different than the circuit breaker 20 and rotational handle mechanism 22, to be installed in the motor control center where the circuit breaker 20 was installed without modifying the bucket 40. The bucket 40 and door 50 are the same as that shown in FIGS. 1-3.

FIGS. 6A-D are views of the standoff 130 included in the circuit breaker replacement kit in accordance with an example embodiment of the disclosed concept. The standoff 130 includes a front panel 150, side panels 151 and 152, and rear flanges 153 and 154. Circuit breaker mounting holes 135,136,137,138 are formed in the front panel 150. The circuit breaker mounting holes 135,136,137,138 correspond to mounting holes on the rear of the circuit breaker 100 such that the circuit breaker 100 may be attached to the front panel 150 of the standoff 130 via the mounting holes 135,136,137,138 using fasteners such as, without limitation, bolts.

The standoff 130 further includes bucket mounting holes 131,132,133,134 that correspond to existing holes 41,42,43, 44 in the bucket (shown in FIG. 3). Two of the bucket mounting holes 131,132 are formed in one rear flange 154 of the standoff 130 and correspond to two existing holes 41,42 in a rear panel of the bucket 40. Two of the bucket mounting holes 133,134 are formed in one side panel 151 of the standoff 130 and correspond to two existing holes 43,44 in a side panel of the bucket 40. The standoff 130 may be attached to the bucket 40 via the mounting holes 131,132, 133,134 using fasteners such as, without limitation, bolts. Since the mounting holes 131,132,133,134 correspond to existing holes 41,42,43,44 in the bucket 40, modifications such as cutting, drilling, or thread-tapping of the bucket 40 are not needed in when attaching the standoff 130 to the bucket 40.

FIG. 4 shows the circuit breaker 100 attached to the standoff 130. The circuit breaker 100 and handle operator 110 have different dimensions than the circuit breaker 20 and rotational handle mechanism 22 shown in FIGS. 1 and 2. The standoff 130 has a depth to accommodate the different dimension of the circuit breaker 100 and handle operator 110. For example, the depth of the standoff 130 is such that when the circuit breaker 100 and handle operator 110 are attached to the standoff 130 and installed in the bucket 40, a front face of the handle operator 110 is substantially flush with the door 50. The front face of the handle operator 110 must be substantially flush with the door 50 in order to provide arc flash protection. In accordance with example embodiments of the disclosed concept, the depth of the standoff 130 allows a circuit breaker that has different dimensions than the circuit breaker it is replacing to be installed in the bucket 40 while still allowing the front face of the handle operator 110 to be substantially flush with the door 50.

FIGS. 7A-D are views of the door interface panel 120 included in the circuit breaker replacement kit in accordance with an example embodiment of the disclosed concept. The door interface panel 120 includes a first planar portion 127 having an opening 126 formed therein and a second planar portion 128 along one edge of the first planar portion 127 and arranged substantially perpendicular to the first planar portion 127. The first planar portion 127 has mounting holes 121,122,123 formed therein. The mounting holes 121,122, 123 correspond to existing holes 51,52,53 in the door 50 (shown in FIG. 2). The door interface panel 120 may be attached to the door 50 via the mounting holes 121,122,123 using fasteners such as, without limitation, bolts.

The opening 126 formed in the first planar portion 127 of the door interface panel 120 has a size and shape corresponding to a handle of the handle operator 110. In the example embodiment shown in FIGS. 4 and 5, the opening 126 has a rectangular shape to accommodate the handle of the handle operator 110 as opposed to the round shape of the rotational handle mechanism 22. As shown in FIG. 5, the door interface panel 120 is operable to change the shape of the opening 126 in the door 50 from round to rectangular to accommodate the difference between the rotational handle mechanism 22 and the handle operator 110. The opening 126 in the door interface panel 120 allows operation of the handle of the handle operator 110 from outside the motor control center when the door 50 is closed.

The second planar portion 128 of the door interface panel 120 includes mounting holes 124,125 that facilitate attaching the safety latch 140 to the door interface panel. The safety latch 140 includes mounting holes 141,142 that correspond to the mounting holes 124,125 of the door interface panel 120. The safety latch 140 may be attached to the door interface panel 120 using fasteners such as, without limitation, bolts.

Figure 8A:
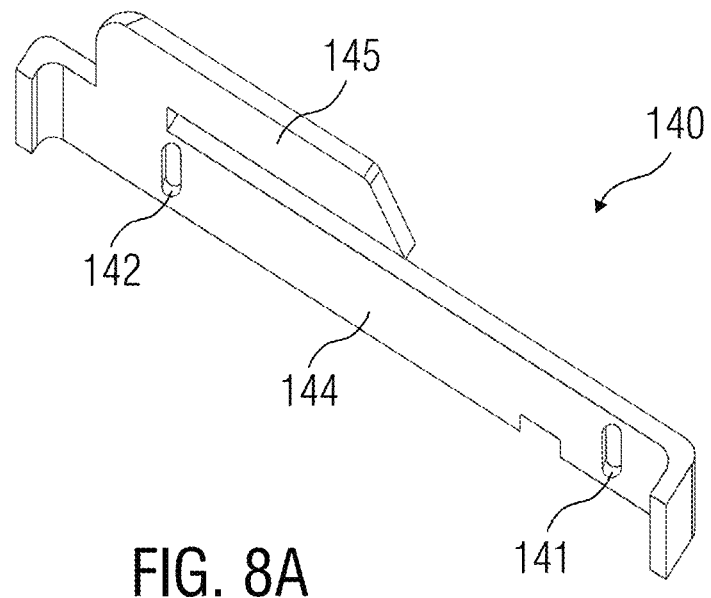
FIGS. 8A-B are views of a safety latch included in a circuit breaker replacement kit in accordance with an example embodiment of the disclosed concept.
Figure 8B:
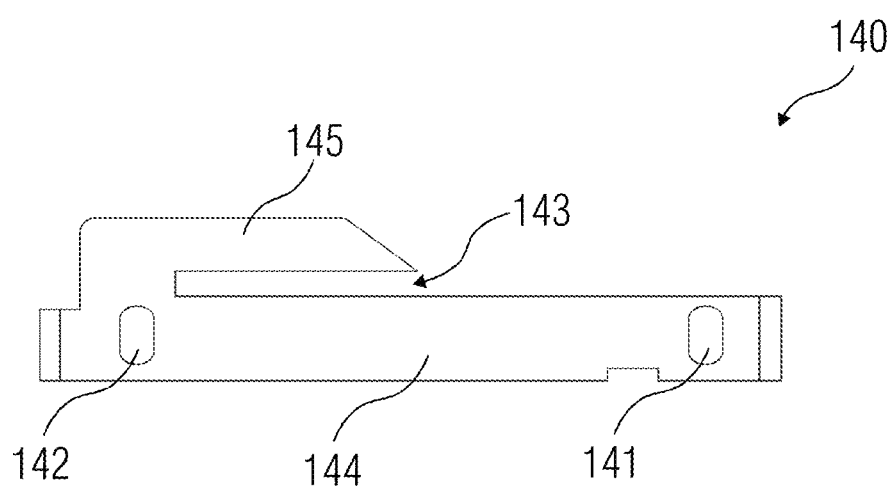

FIGS. 8A-B are views of the safety latch 140 included in the circuit breaker replacement kit in accordance with an example embodiment of the disclosed concept. The safety latch 140 includes a first portion 144 that has a size and shape corresponding to the second planar portion 128 of the door interface panel 120. The safety latch 140 also includes a second portion 145 that is attached at one end to the first portion while the second end is not attached to the first portion, resulting in a slot 143 formed between the first portion 144 and second portion 145 of the safety latch 140.

The handle operator 110 includes a tab 111 that moves in conjunction with the handle of the handle operator 110. When the circuit breaker 100, handle operator 110, and safety latch 140 are installed in the bucket 40, as shown for example in FIG. 4, and the door 50 is closed, the tab 111 will slide into the slot 143 of the safety latch 140 when the handle is in the on position, energizing the circuit breaker 110, and will slide out of the slot 143 when the handle is in the off position, de-energizing the circuit breaker 110. In this manner, when the circuit breaker 110 is energized, the tab 111 will be disposed in the slot 143, thus preventing the door 50 from being opened. Once the circuit breaker 110 is de-energized, the tab 111 is disposed outside the slot 143, thus allowing the door 50 to be opened.

In some example embodiments, the handle operator 110 includes a defeater mechanism 112 (shown in FIG. 4), which allows the tab 111 to be disengaged from the safety latch 140 and the door 50 to be opened even if the circuit breaker 100 is energized. In some example embodiments, the defeater mechanism 112 include a screw or bolt that can be turned by an operator outside the bucket 40 when the door 50 is closed.

It will be appreciated that the disclosed concept may be embodied as a method of replacing a circuit breaker in a motor control center. The method may include steps such as removing the existing circuit breaker 20 from the motor control center 10, installing the standoff 130 in the bucket 40, attaching the circuit breaker 100 to the standoff 130, attaching the door interface panel 120 to the door 50, and attaching the safety latch 140 to the door interface panel 120. However, it will be appreciated that these are simply example steps. The steps may be modified, rearranged, added to, or deleted from without departing from the scope of the disclosed concept.

As described herein, in accordance with example embodiments of the disclosed concept, an existing circuit breaker in a motor control center can be replaced with a different circuit breaker without modifying the bucket of the motor control center or completely replacing the motor control center. For example, with the motor control center circuit breaker replacement kit, a discontinued circuit breaker can be replaced with a different circuit breaker.

While the disclosed concept provides example embodiments of a circuit breaker replacement kit that accommodates replacing a particular circuit breaker in a particular motor control center with a different particular circuit breaker, it will be appreciated that the disclosed concept may be applied to various different circuit breaker and motor control center applications. For example, the depth and mounting hole locations of the standoff 130 may be varied depending on the application without departing from the scope of the disclosed concept. Similarly, the mounting hole locations and size and shape of the opening of the door interface panel 120 may be modified without departing from the scope of the disclosed concept. In this manner, motor control center circuit breaker replacement kits that include a standoff, door interface panel, and safety latch which allow an existing circuit breaker in a particular motor control center to be replaced with a different type of circuit breaker without modifying the bucket of the motor control center are considered within the scope of the disclosed concept.

While specific embodiments of the invention have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the invention which is to be given the full breadth of the appended claims and any and all equivalents thereof.

What is claimed is:

1. A circuit breaker replacement kit for a motor control center, the circuit breaker replacement kit comprising:
    a standoff having
        a first plurality of mounting holes corresponding to existing holes on a bucket of the motor control center, and
        a second plurality of holes corresponding to existing holes on a replacement circuit breaker;
    a door interface panel having a third plurality of holes corresponding to existing holes on a door of the motor control center, the door interface panel having an opening formed therein having a size and shape corresponding to a handle of a replacement handle operator associated with the replacement circuit breaker, wherein the shape of the opening of the door interface panel corresponding to the handle is different than a shape of an opening of the door of the motor control center; and
    a safety latch configured to be attachable to the door interface panel and having a slot structured to receive a tab of the replacement handle operator,
    wherein the tab is configured to slide into the slot of the safety latch in an on position and wherein the circuit breaker is energized or wherein the tab is configured to slide out of the slot of the safety latch in an off position and wherein the circuit breaker is de-energized.

2. The motor control center of claim 1, wherein the handle of the replacement handle operator comprises a defeater mechanism configured to disengage the tab from the safety latch while the circuit breaker is energized.

3. A method of replacing a first circuit breaker in a motor control center, wherein the first circuit breaker comprises a first handle operator having a rotational handle mechanism, wherein the motor control center comprises a door and a bucket, and wherein the door and the bucket are configured to accommodate the first circuit breaker, the method comprising:
    removing a first circuit breaker and first handle operator from a bucket of the motor control center;
    installing a standoff in the bucket, the standoff having a first plurality of holes corresponding to existing holes on the bucket;
    attaching a second circuit breaker to the standoff, wherein the second circuit breaker comprises a second handle operator, wherein a handle of the second handle operator does not have a rotational handle mechanism, and wherein the standoff having a second plurality of holes corresponding to existing holes on the second circuit breaker;
    installing a door interface panel to a door of the motor control center, the door interface panel having a third plurality of holes corresponding to existing holes on the door, wherein the door interface panel has a size and shape corresponding to the handle of the second handle operator; and
    attaching a safety latch to the door interface panel, the safety latch configured to be attachable to the door interface panel and having a slot structured to receive a tab of the second handle operator.

4. The method of claim 3, wherein the handle of the second handle operator comprises a defeater mechanism configured to disengage the tab from the safety latch while the circuit breaker is energized.

5. A circuit breaker replacement kit for a motor control center, the circuit breaker replacement kit comprising:
    a standoff having
        a first plurality of mounting holes corresponding to existing holes on a bucket of the motor control center, and
        a second plurality of holes corresponding to holes on a replacement circuit breaker;
    a door interface panel having a third plurality of holes corresponding to existing holes on a door of the motor control center, the door interface panel having an opening formed therein having a size and shape corresponding to a handle of a replacement handle operator associated with the replacement circuit breaker; and
    a safety latch configured to be attachable to the door interface panel and having a slot structured to receive a tab of the replacement handle operator;
    wherein the door and the bucket are configured to accommodate an existing circuit breaker having a rotational handle mechanism; and
    wherein the handle of the replacement handle operator is not a rotational handle mechanism.

6. The circuit breaker replacement kit of claim 5, wherein the standoff has a depth that results in a front face of the handle operator being substantially flush with the door when the standoff is installed in the bucket and the circuit breaker and handle operator are attached to the standoff.

7. The circuit breaker replacement kit of claim 5, wherein the opening of the door interface panel has a rectangular shape.

8. The motor control center of claim 5, wherein the tab is configured to slide into the slot of the safety latch in an on position, wherein the circuit breaker is energized.

9. The motor control center of claim 5, wherein the tab is configured to slide out of the slot of the safety latch in an off position, wherein the circuit breaker is de-energized.

10. The motor control center of claim 5, wherein the handle of the replacement handle operator comprises a defeater mechanism configured to disengage the tab from the safety latch while the circuit breaker is energized.

11. The circuit breaker replacement kit of claim 5, wherein the standoff includes a side panel and a rear flange, wherein at least one of tile first plurality of holes is disposed in the side panel and at least one of the first plurality of holes is disposed in the rear flange.

12. The circuit breaker replacement kit of claim 11, wherein the standoff includes a front panel, wherein the second plurality of holes are formed in the front panel.

13. A motor control center comprising:
    a replacement circuit breaker;
    a replacement handle operator attached to the replacement circuit breaker;
    a door;
    a bucket;

a standoff having a first plurality of mounting holes corresponding to holes on the bucket, the standoff being attached to the bucket via the first plurality of holes, and a second plurality of holes corresponding to holes on the replacement circuit breaker, the standoff being attached to the replacement circuit breaker via the second plurality of holes;

a door interface panel having a third plurality of holes corresponding to holes on the door, the door interface panel being attached to the door via the third plurality of holes, wherein tile door interface panel has an opening formed therein having a size and shape corresponding a handle of the replacement handle operator; and a safety latch configured to be attachable to the door interface panel and having a slot structured to receive a tab of the replacement handle operator;

wherein the door and the bucket are configured to accommodate an existing circuit breaker having a rotational handle mechanism; and wherein the handle of the replacement handle operator does not have a rotational handle mechanism.

14. The motor control center of claim 13, wherein the standoff has a depth that results in a front face of the handle operator being substantially flush with the door when the standoff is installed in the bucket and the circuit breaker and handle operator are attached to the standoff.

15. The motor control center of claim 13, wherein the opening of the door interface panel has a rectangular shape.

16. The motor control center of claim 13, wherein the handle of the replacement handle operator comprises a defeater mechanism configured to disengage the tab from the safety latch while the circuit breaker is energized.

17. The motor control center of claim 13, wherein the standoff includes a side panel and a rear flange, wherein at least one of the first plurality of holes is disposed in the side panel and at least one of the first plurality of holes is disposed in the rear flange.

18. The motor control center of claim 17, wherein the standoff includes a front panel, wherein the second plurality of holes are formed in the front panel.

* * * * *